United States Patent
Tyagi et al.

(10) Patent No.: US 10,860,836 B1
(45) Date of Patent: Dec. 8, 2020

(54) GENERATION OF SYNTHETIC IMAGE DATA FOR COMPUTER VISION MODELS

(71) Applicant: Amazon Technologies, Inc., Seattle, WA (US)

(72) Inventors: Ambrish Tyagi, Sunnyvale, CA (US); Amit Kumar Agrawal, Santa Clara, CA (US); Siddhartha Chandra, Santa Clara, CA (US); Visesh Uday Kumar Chari, San Francisco, CA (US); Shashank Tripathi, Pittsburgh, PA (US); James Rehg, Atlanta, GA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 90 days.

(21) Appl. No.: 16/192,433

(22) Filed: Nov. 15, 2018

(51) Int. Cl.
| | |
|---|---|
| G06K 9/00 | (2006.01) |
| G06T 7/194 | (2017.01) |
| G06N 3/08 | (2006.01) |
| G06N 20/00 | (2019.01) |

(52) U.S. Cl.
CPC ......... G06K 9/00221 (2013.01); G06N 3/084 (2013.01); G06N 20/00 (2019.01); G06T 7/194 (2017.01); *G06T 2207/20081* (2013.01)

(58) Field of Classification Search
None
See application file for complete search history.

(56) References Cited

U.S. PATENT DOCUMENTS

2015/0297949 A1* 10/2015 Aman .................... G06T 7/246
348/157

* cited by examiner

*Primary Examiner* — Suhail Khan
(74) *Attorney, Agent, or Firm* — K&L Gates LLP

(57) ABSTRACT

Techniques are generally described for object detection in image data. First image data comprising a first plurality of pixel values representing an object and a second plurality of pixel values representing a background may be received. First foreground image data and first background image data may be generated from the first image data. A first feature vector representing the first plurality of pixel values may be generated. A second feature vector representing a first plurality of pixel values of second background image data may be generated. A first machine learning model may determine a first operation to perform on the first foreground image data. A transformed representation of the first foreground image data may be generated by performing the first operation on the first foreground image data. Composite image data may be generated by compositing the transformed representation of the first foreground image data with the second background image data.

20 Claims, 8 Drawing Sheets

GENERATION OF SYNTHETIC IMAGE DATA FOR COMPUTER VISION MODELS

BACKGROUND

Machine learning is a field of artificial intelligence that allows computer-implemented systems to perform a task without the use of task-specific code. Machine learning systems may be trained to progressively improve performance of a task using sets of training data. In computer vision, machine learning models are used to detect objects, such as people, cars, animals, and other objects of interest from input image data. In supervised machine learning, annotated data (e.g., data with a labeled input and desired output) can be used to "train" a machine learning model. During training, parameters (e.g., weights and/or biases) of the machine learning model are adjusted so that the output of the machine learning model for a given input matches the desired output from the annotated data. Thereafter, during inference, the trained machine learning model can make predictions when provided with unannotated input data. Accuracy and/or predictive value of machine learning models are often a function of the quantity and quality of annotated data used to train the machine learning model.

DETAILED DESCRIPTION

Figure 1:
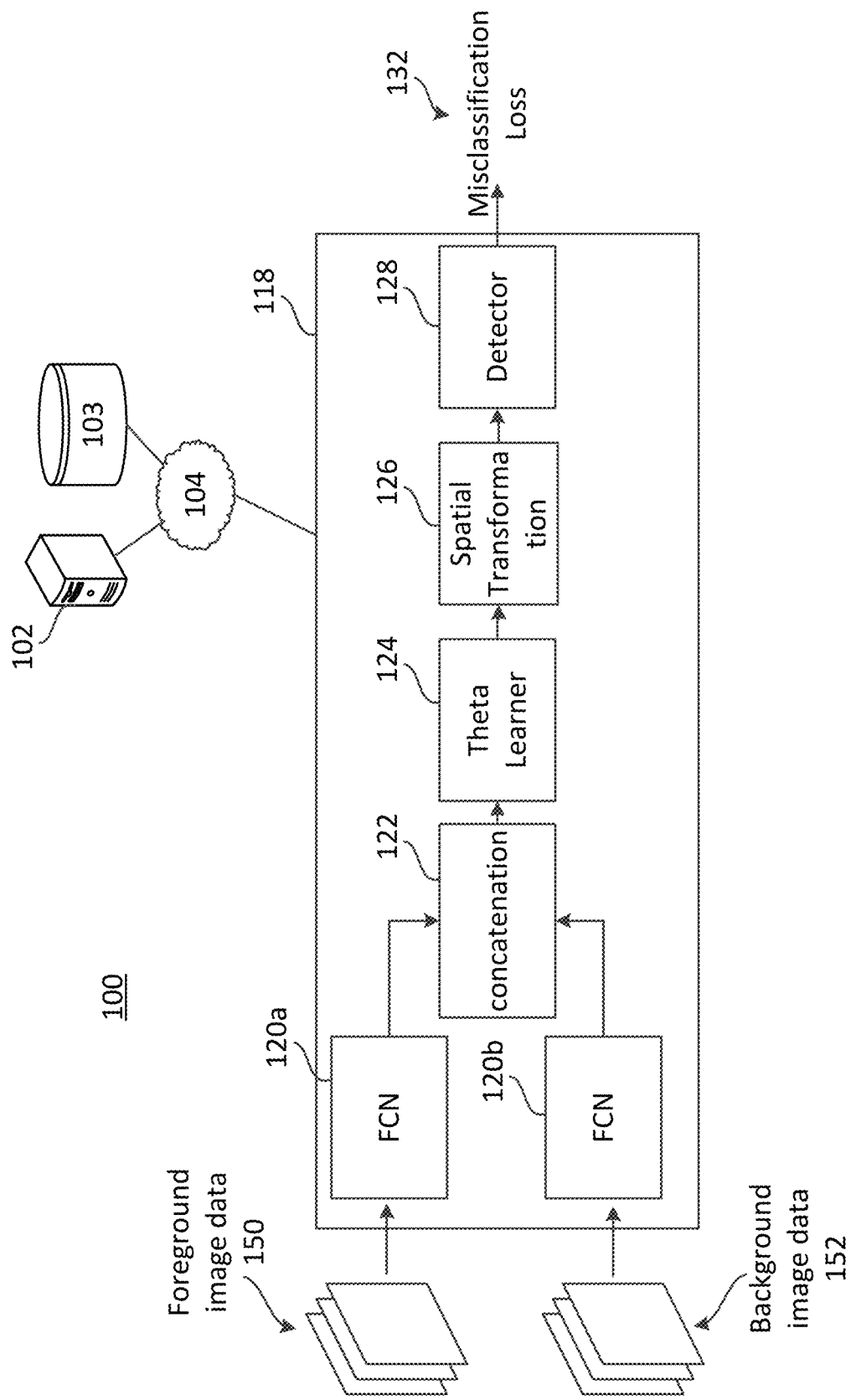
FIG. 1 is a block diagram showing an example system effective to generate synthetic image data, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In various examples, deep learning techniques may be used to detect objects in image data (e.g., pixel representations of objects). Convolutional neural networks (CNNs), single shot detectors (SSDs), region-convolutional neural networks (R-CNNs), Faster R-CNN, Region-based Fully Convolutional Networks (R-FCNs) and other machine learning models may be trained to perform object detection and classification. Object detectors may be trained to detect particular classes of objects (e.g., object classes), such as humans, dogs, furniture, etc. Training an SSD, or other machine learning model, typically requires annotated training data. Annotated training data comprises labeled image data including data representing bounding boxes that identify the location of objects represented in the image data and classification data identifying a class of the object (e.g., data representing "cat", "dog", "human", etc.). Image data (e.g., frames of image data) and/or feature vectors extracted from image data may be annotated or unannotated. Object detection by machine learning models is heavily dependent on annotated training data. Generally, although feature vectors may be referred to herein, the various techniques described below may instead use (or additionally use) feature maps. Accordingly, as used herein, feature data may refer to either feature vectors, feature maps, or some combination thereof.

Training data for training computer vision object detection models may be expensive and time-consuming to generate. In various examples, images may be manually annotated by humans. However, such a process is slow and cumbersome and only allows for existing images to be converted into labeled image data without providing new images. In some other examples, synthetic training data may be generated. Some techniques include using virtual image data, such as computer-generated images from video games, to generate frames of annotated image data. In such examples, annotation is already provided as location information of objects in video game data are provided in the code for the video games. In various other example techniques, objects of interest may be cut from existing image data and composited with other images. Such techniques multiply the number of data points in a training data set. For example, a single annotated image may include ten people and ten bounding boxes (one around each person). Such an annotated image provides a single data point for a training data set that can be used to train a human detector machine learning model. However, if a single image of a person is cut from an image and composited at known locations in ten different images, ten data points are created that can be used to train the human detector machine learning model. Accordingly, generation of synthetic training data may greatly increase the amount of annotated data available for training object detectors.

In various examples, image segmentation may be used to separate objects-of-interest in image data from background image data. Objects-of-interest may include any objects for which a machine learning detector model is being trained to detect. Some examples may include humans, furniture, buildings, cars, roads, dogs, cats, surfaces, patterns, etc. Various image segmentation algorithms are known and may be used to segment the object-of-interest from the background image data. After segmentation, the object-of-interest image data may be referred to as "foreground image data". Foreground image data and background image data may be input to one or more fully convolutional networks (FCNs) that may extract feature vectors describing one or more visual components of the foreground and/or background image data. The foreground image data and the background image data that is provided to the FCNs may not necessarily correspond to the original image from which the foreground and background image data were segmented. In fact, it may be advantageous to mix and match foreground image data and background image data to increase the number of data points available for training an object detection model. For example, segmented foreground image data may be "pasted" into multiple other frames of image data to create a plurality of data points that may be used to train a detector.

After extracting a foreground feature vector and a background feature vector, the feature vectors may be concatenated. The concatenated feature vector may be provided to a deep learning network, such as a CNN, that may be effective to determine, based on the concatenated feature vectors, operations to be performed on the foreground image data in order to generate a composite of the foreground image data and the background image data. The deep learning network is referred to herein as a "theta learner". Thereafter, a spatial transformation layer may combine the foreground image data with the background image data to generate a frame of synthetic composite image data (sometimes referred to herein as a frame of composite image data). The spatial transformation layer may perform the operations determined by the theta learner on the foreground image data in order to combine the foreground image data with the background image data. The spatial transformation layer may generate the synthetic composite image data by compositing the background image data and the foreground image data (as transformed according to the operations determined by the theta learner) on a pixel-by-pixel basis. For example, the spatial transformation layer may determine, for each pixel address of the background image data whether or not a pixel of the foreground image data should be composited at the pixel address according to operations determined by the theta learner. Additionally, in various examples, the spatial transformation layer may determine whether or not pixels of the foreground image data composited with the background image data should be blended with one or more surrounding pixel values of the background image data. As used herein, the term compositing refers to putting one image inside another image. For example, a set of pixels representing a human may be composited in a background image, by replacing pixel values of the background image with pixel values representing the human.

In various examples, the synthetic composite image data may be provided to a natural image classifier. The natural image classifier may be a classifier trained to determine whether or not an input image is real (e.g., natural image data captured by an image sensor) or synthetic (e.g., synthetic composite image data generated using the previous machine learning layers described above). In various examples, the determination made by the natural image classifier may be a score indicating a confidence that the input image data is real. In other implementations the score may indicate a confidence that the input image data is synthetic. Back propagation may be used to provide a feedback data to the theta learner indicating the score. The theta learner may update parameters (e.g., biases and/or weights) to maximize the likelihood that the natural image classifier will determine that images are real. For example, if a higher score (e.g., a score closer to 1) indicates that the natural image classifier has determined that an image is real and a lower score (e.g., a score closer to 0) indicates that the natural image classifier has determined that an image is synthetic, the theta learner may be trained using back propagation from the natural image classifier to maximize the score. Additionally, the natural image classifier may be trained using ground truth data (e.g., labels indicating whether image data is real or synthetic).

The synthetic composite image data may be provided to an object detector. The object detector may be, for example, a single shot detector (SSD) or any computer vision object detection model. The detector may attempt to detect objects-of-interest (e.g., objects that the detector has been trained to detect) in the synthetic composite image data. For example, if the detector has been trained to detect humans, the detector may generate a bounding box surrounding pixels that the detector has identified as corresponding to a human. The detector may generate a confidence score indicating a confidence that the bounding box corresponds to a human. The confidence score may be back propagated to the theta learner as feedback data. A training objective of the theta learner may be to minimize the confidence scores of the detector. Accordingly, parameters (e.g., weights and/or biases) of the theta learner may be updated to minimize confidence scores generated by the detector. Accordingly, the theta learner may be retrained based on back propagation signals from the detector. Parameters control activations in neurons (or nodes) within layers of the machine learning models. For example, the weighted sum of activations of each neuron in a preceding layer may be input to an activation function (e.g., a sigmoid function and/or rectified linear units (ReLu) function). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function.

In some examples, the detector may be unable to detect objects-of-interest within the synthetic composite image data. This may be the case even where the foreground image data used to generate the synthetic composite image data represents one or more objects-of-interest (in other words, this may be the case even where objects-of-interest are indeed represented in the image data). During the synthetic image data generation stage described herein, synthetic composite image data in which the detector is unable to detect an object-of-interest may be referred to as a "hard positive". Hard positives may be stored in a non-transitory computer-readable memory. Since the training goal of the theta learner is to determine operations to perform on foreground image data that will minimize the confidence score of the detector, over time as the parameters of the theta learner are updated to minimize the confidence score of the detector, the theta learner causes more and more hard positives to be generated. Once a sufficient number (e.g., a threshold number) of hard positives have been generated, the detector may be retrained, by mixing the hard positive image data with other training data (e.g., with real/natural annotated images). Hard positive image data may be especially beneficial for training the detector, as the hard positive image data represents "blind spots" of the training data distribution used to current iteration of the detector. As such, training the detector using hard positives mixed with nominal training data may allow the detector to improve its performance during inference relative to detectors trained using currently available sets of annotated image data, alone.

As described herein, "synthetic" or "fake" composite image data may refer to image data generated by combining transformed segmented foreground image data with background image data. The terms "synthetic" and "fake" may be used interchangeably in this context. The foreground image data may not necessarily be recombined with the same background image data from which the foreground image data was segmented. Conversely, "real" image data refers to the actual images captured by a camera or other sensing device. Annotated image data that has been provided for training (e.g., real image data captured by a camera and labeled with one or more bounding boxes identifying the location and/or classification of an object-of-interest) may be referred to herein as "real" annotated image data.

FIG. 1 is a block diagram showing an example system 100 effective to generate synthetic image data, arranged in accordance with various aspects of the present disclosure. In various examples, system 100 may comprise a synthetic composite image data training network 118 that may be implemented by computing device(s) 102. In some examples, synthetic composite image data training network 118 may comprise fully convolutional networks (FCNs) 120a and 120b. Although two FCNs are depicted in FIG. 1, in various examples, more or fewer FCNs may be used in accordance with the desired implementation.

FCN 120a may be a convolutional neural network (CNN) in which the last fully connected layer is substituted by another convolution layer with a large receptive field to localize activations. FCN 120a may generate a feature vector describing one or more components represented in the input image data. Generating a feature vector from the input image data may reduce the dimensionality of subsequent processing. In various examples, FCN 120a may receive foreground image data 150 (e.g., a frame of foreground image data) and may extract feature vectors describing the foreground image data 150. FCN 120a may be trained to extract feature vectors of foreground image data prior to use of synthetic composite image data training network 118 to generate synthetic composite image data, as described in further detail below.

Foreground image data 150 may be image data that has been segmented from its native background image data. For example, a segmentation algorithm may be used to segment humans represented in image data from background image data. In such an example, a segmentation algorithm may generate a segmentation map that indicates which pixels correspond to humans and which pixels do not. Those pixels that correspond to humans (e.g., foreground image data 150) may be segmented from those pixels that do not (e.g., background image data 152). A segmentation algorithm may be used to generate a library of background image data 152 and a library of foreground image data 150. The libraries of foreground image data 150 and background image data 152 may be used by synthetic composite image data training network 118 to generate synthetic composite image data that may, in turn, be used to improve detector 128, as described in further detail below. In at least some other implementations, an FCN or CNN may also be used to segment image data (e.g., to generate foreground and background image data from input image data) and to extract feature vectors from the segmented image data.

FCN 120b may generate a feature vector describing one or more components represented in the input image data. Generating a feature vector from the input image data may reduce the dimensionality of subsequent processing. In various examples, FCN 120b may receive background image data 152 (e.g., a frame of background image data) and may extract feature vectors describing the background image data 152. FCN 120b may be trained to extract feature vectors of background image data prior to use of synthetic composite image data training network 118 to generate synthetic composite image data, as described in further detail below.

Examples of FCN 120a, 120b may include Alexnet, Resnet, VGG16, etc. A feature vector describing input foreground image data 150 (extracted by FCN 120a) and a feature vector describing input background image data 152 (extracted by FCN 120b) may be concatenated to generate a composite feature vector. The concatenated composite feature vector may reduce the dimensionality of further processing. For example, input frames of foreground and background image data may be 300×300 pixels, respectively. FCN 120a may generate a 128×1 feature vector representing the foreground frame and FCN 120b may generate a 128×1 feature vector representing the background frame. Accordingly, the concatenation of the feature vectors may generate a 256×1 composite feature vector. Concatenation may be performed at concatenation component 122 which may be implemented as hardware (e.g., as an application specific integrated circuit, field programmable gate array, or the like), in software, or in some combination thereof. Although in FIG. 1, two FCNs (120a, 120b) are depicted, in various other examples, a single FCN may be used to extract feature data from segmented foreground image data and background image data. In various other examples, FCNs 120a, 120b may share one or more parameters and/or layers. In some further examples, different architectures may be used to extract feature data. For example, the output of two separately trained FCNs may be fed into a different FCN to extract feature vectors from foreground image data and/or background image data. Various other implementations of feature extraction components are possible and will be apparent to those skilled in the art.

The concatenated vector may be sent to theta learner 124. Theta learner 124 may be, for example, a CNN that may be initialized (e.g., randomly) and trained to determine one or more operations to perform on the foreground image data 150 to generate synthetic composite image data. Examples of operations may include translation (e.g., a translation of the two dimensional foreground image data from an original position in the foreground image to a different position in the x, y plane of the background image when compositing the foreground image data with the background image data 152), rotation (e.g., rotation of the foreground image when compositing the foreground image with the background image), scaling (e.g., changing the size of the foreground image relative to the background image), shearing (e.g., changing the size of the foreground image in one dimension by a first amount and in a second dimension by a second amount different from the first amount), color scaling (changing brightness and/or intensity of color values of pixels of the foreground image to make the foreground image look lighter or darker), etc. For example, chrominance and/or luminance values of pixels of the foreground image data 150 may be adjusted in order to match chrominance and/or luminance values of proximate pixels in the background image data 152. Additionally, illumination artifacts may be added to the synthetic composite image data either in the foreground region, the background region, or both. An example of an illumination artifact may be changing illumination values of pixels according to a new light source in the scene, such as a lamp or other light source. The illumination values may be changed non-uniformly to simulate the light source on both the foreground and background image data.

As discussed in further detail below, parameters of theta learner 124 (e.g., weights and/or biases) may be updated during processing using back propagation to improve the performance of theta learner 124. The training objective of theta learner 124 may be to maximize misclassification loss 132 of detector 128. Stated another way, the training objective of theta learner 124 is to minimize the confidence score of object-of-interest detections made by detector 128 and thereby to generate "hard positive" synthetic composite image data. Hard positive synthetic composite image data is image data that includes foreground image data 150 (as transformed by theta learner 124) composited with background image data 152 in which detector 128 is unable to detect any objects-of-interest—despite presence of objects-of-interest represented within the synthetic composite image data. Misclassification loss may be loss related to object detection by detector 128. A training objective of theta learner 124 may be to increase misclassification loss of detector 128. Accordingly, parameters of theta learner 124 may be updated to increase the misclassification loss of detector 128.

In various other examples, hard negative training data may be generated. An example of hard negative training data may be where detector 128 determines that an object-of-interest is present when, in fact, no object-of-interest is represented in the image data. For example, detector 128 may be trained to detect humans. In the example, a cat may be composited with background image data. If the detector 128 classifies the cat as a human, the composite image data may be referred to as a hard negative. In the example, detector 128 may also be trained using hard negative data to minimize error for the human class of objects. Accordingly, detector 128 may be trained to maximize human class confidence scores. Generally, as described herein, hard training data and/or hard training images may refer to either hard positive or hard negative synthetic composite image data.

After determining the operations to be used to transform foreground image data 150, spatial transformation layer 126 may generate the synthetic composite image data by transforming the foreground image data 150 according to the operations determined by theta learner 124 (e.g., by rotating, shearing, translating, color scaling, blending, etc., the foreground image) and by replacing a subset of the pixel values of background image data 152 with pixel values of the foreground image data 150, as transformed by the operations determined by theta learner 124. In various examples, the generate the synthetic composite image data, the spatial transformation layer may evaluate pixels of the background image data 152 on a pixel-by-pixel basis to determine whether or not the pixel values at each pixel address should be replaced by a pixel value of the foreground image data. In various examples, the spatial transformation layer 126 may determine a plurality of pixel addresses in the background image data 152 at which to render the transformed foreground image data 150 (e.g., the transformed representation of the foreground object-of-interest). Thereafter, the spatial transformation layer 126 may composite the foreground image data 150 with the background image data 152 on a pixel-by-pixel basis at the determined plurality of pixel addresses.

In various examples, the spatial transformation layer 126 may be a shallow FCN that is pre-trained prior to run time of synthetic composite image data training network 118. Spatial transformation layer 126 may receive signals from theta learner 124 describing the operations to be performed to transform the foreground image data 150 as well as parameters related to the transformation. For example, spatial transformation layer 126 may receive a signal indicating that the foreground image should be rotated. Additionally, the spatial transformation layer 126 may receive the parameters "Counterclockwise" and "45°" related to the rotation operation. Spatial transformation layer 126 may compose the foreground image data 150, as transformed according to the operations and parameters received from theta learner 124, at the appropriate location in the frame of background image data 152 to generate synthetic composite image data (e.g., a frame of synthetic composite image data). As previously described, the background image data 152 may typically be different from the background image data from which foreground image data 150 was segmented. In various examples, after performing one or more transformation operations determined by theta learner 124 such as rotating, translating, color scaling, etc., the spatial transformation layer 126 may use blending techniques to make the foreground image appear more natural when composited into the background image. Various blending techniques such as Gaussian blurring, alpha blending, Image Inpainting, Poisson Matting, etc., are known and may be used to blend the transformed foreground image with the background image.

The synthetic composite image data generated by spatial transformation layer 126 may be sent to detector 128. Detector 128 may be a single shot detector (SSD) or other detector effective to locate and/or classify objects-of-interest in image data. For example, detector 128 may be an object detector that has been trained with the publicly-available MNIST (Modified National Institute of Standards and Technology) training dataset of handwritten numbers between 0 and 9. In the example, detector 128 may be trained using the MNIST dataset to identify numbers represented in image data. Detector 128 may generate a bounding box that identifies the location of a number detected in the input image data (e.g., in the synthetic composite image data generated by synthetic composite image data training network 118). Misclassification loss 132 may occur when detector 128 misidentifies a number. Stated another way, misclassification loss 132 may occur when detector 128 identifies a number in image data where no number is present and/or when detector 128 identifies an incorrect number (e.g., detector 128 identifies the number 6 as the number 0). In various examples, for each bounding box generated by detector 128, detector 128 may generate a confidence score indicating a confidence that detector 128 has correctly identified the number bounded by the bounding box.

In various examples, computing device(s) 102 may be effective to implement synthetic composite image data training network 118 and/or perform segmentation to generate foreground image data 150 and/or background image data 152. In various examples, computing device(s) 102 may be configured in communication such as over a network 104. Network 104 may be a wide area network, such as the internet, a local area network, and/or some combination thereof. Additionally, in various examples, computing device(s) 102 may be configured in communication with a non-transitory, computer-readable memory 103. Non-transitory, computer-readable memory 103 may be effective to store one or more instructions that, when executed by at least one processor of computing device(s) 102 program the at least one processor to perform the various techniques described herein.

Additionally, in some examples, different components of system 100 of FIG. 1 may be implemented by different computing devices. For example, the theta learner 124 may be implemented by a first computing device and FCN 120*a* may be implemented by a second computing device.

Figure 2:
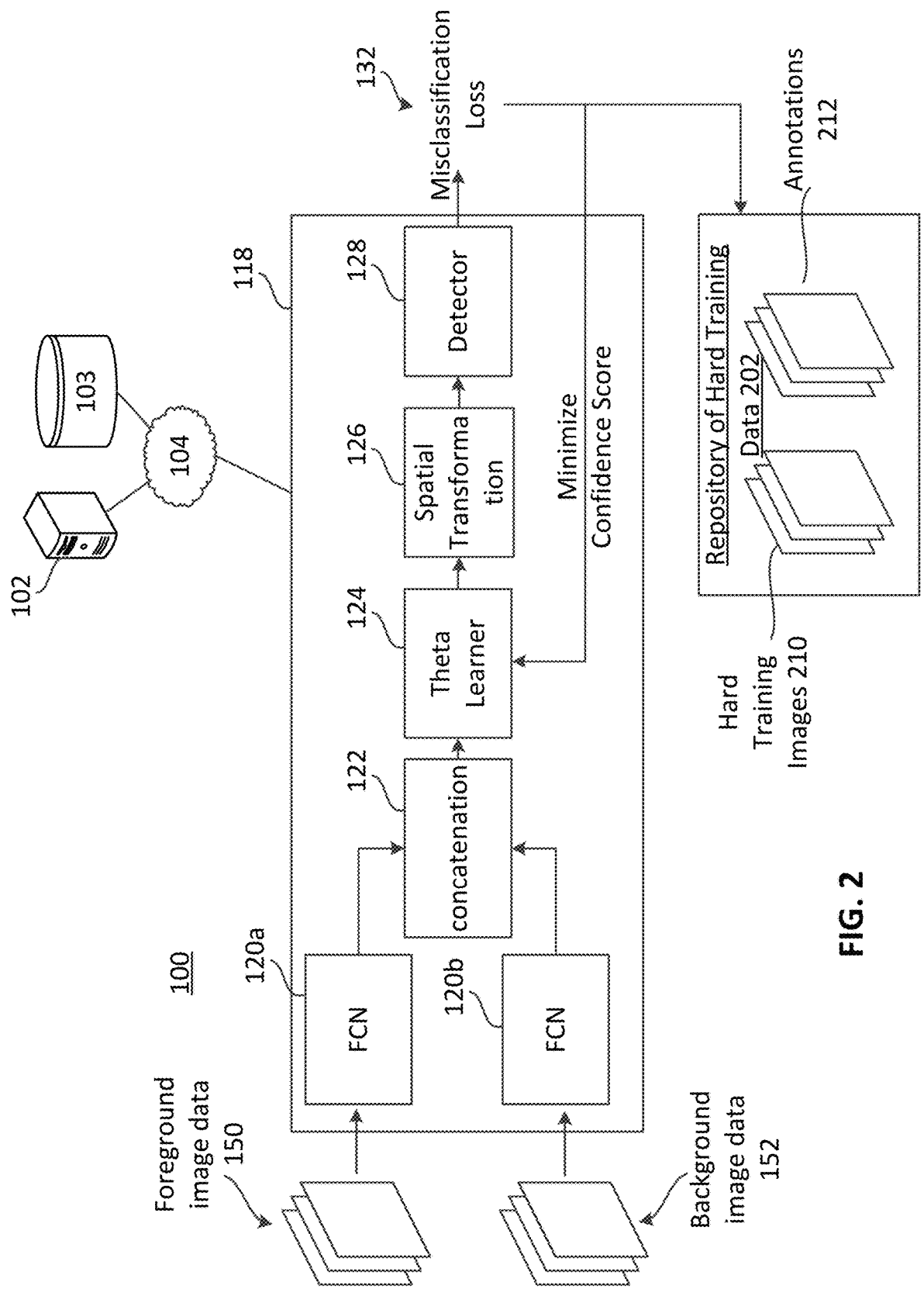
FIG. 2 is a block diagram showing the example system of FIG. 1 and further comprising a depiction of back propagation and a repository of synthetic image data, in accordance with various aspects of the present disclosure.

FIG. 2 is a block diagram showing the example system 100 of FIG. 1 and further comprising a depiction of back propagation and a repository of synthetic image data, in accordance with various aspects of the present disclosure.

In various examples, confidence scores of object detections performed by detector 128 may be back propagated to theta learner 124. Theta learner 124 may minimize the confidence scores generated by detector 128 by updating weights and/or biases of the theta learner 124. Accordingly, over time, theta learner 124 is able to select operations to transform foreground image data 150 that result in increased misclassification loss 132 from detector 128. Additionally, as theta learner 124 is increasingly able to generate synthetic composite image data that is difficult for detector 128 to detect over time, synthetic composite image data training network 118 begins to generate more and more hard training images 210. Hard training images 210 are synthetic composite image data in which detector 128 is unable, in its current run-time state, to detect relevant objects-of-interest. In various examples, the ratio of updates of the theta learner 124 relative to the detector may be greater than 1. For example, weights and/or biases of theta learner 124 may be updated upon every iteration of synthetic composite image data training network 118, while weights and/or biases of detector 128 may be updated every four iterations (or some other suitable number of iterations) of synthetic composite image data training network 118. In the MNIST example above, the theta learner 124 may generate a synthetic composite image by rotating foreground image data 150 depicting a handwritten numeral "3" by 90 degrees clockwise. The detector 128 may be unable to detect any numbers in the synthetic composite image, thus the synthetic composite image (as generated by spatial transformation layer 126) may be stored in a repository of hard training data 202 along with the annotations 212. The annotations 212 may represent a location and/or classification of the object-of-interest. Since the operations performed by theta learner 124 are known for the hard training image 210, the annotation 212 for the hard training image 210 is known and may be stored in association with the hard training image 210.

In various examples, synthetic composite image data training network 118 may be used to generate a particular number of frames of hard training images 210. For example, a target number and/or threshold number of frames of hard training images 210 may be determined. As previously described, hard training images 210 may be synthetic composite image data generated using system 100. After the target and/or threshold number of frames is reached, the hard training images 210 may be mixed with other training data (e.g., training data used to train the detector 128) to generate an updated training dataset. Detector 128 may be trained using the mixture of hard training images 210 and regular training data of the updated training dataset. Training the detector 128 with hard training images 210 along with regular training data may improve the performance of detector 128, as the hard training images 210 represent images that the detector 128, in its previous run-time state, was unable to accurately perform object detection. Accordingly, the hard negative or hard positive training data (e.g., the hard training images or hard training data) may allow the detector 128 to reduce the number of detection "blind spots" in which the detector 128 is unable to accurately detect objects-of-interest in image data.

Additionally, after training the detector using the mix of hard training images 210 and regular training data, the synthetic composite image data training network 118 may again be used to generate additional hard training images 210 for the updated detector 128. After the appropriate number of hard training images 210 are again generated, the detector 128 may be again retrained to further improve the performance of the detector 128. Accordingly, the synthetic composite image data training network 118 may be iteratively used until the performance of detector 128 is optimized. In various examples, the detector 128 may be retrained after a particular number of updates to theta learner 124 (e.g., after a threshold number of updates, such as 2, 3, 4, 5, or any other suitable number of updates). In some other examples, the detector 128 may be retrained after a particular number of hard training images 210 are generated and stored in repository of hard training data 202. In some further examples, detector 128 may be retrained whenever the theta learner 124 has been updated a threshold number of times or when a threshold number of hard training images 210 are generated—whichever occurs first.

Figure 3:
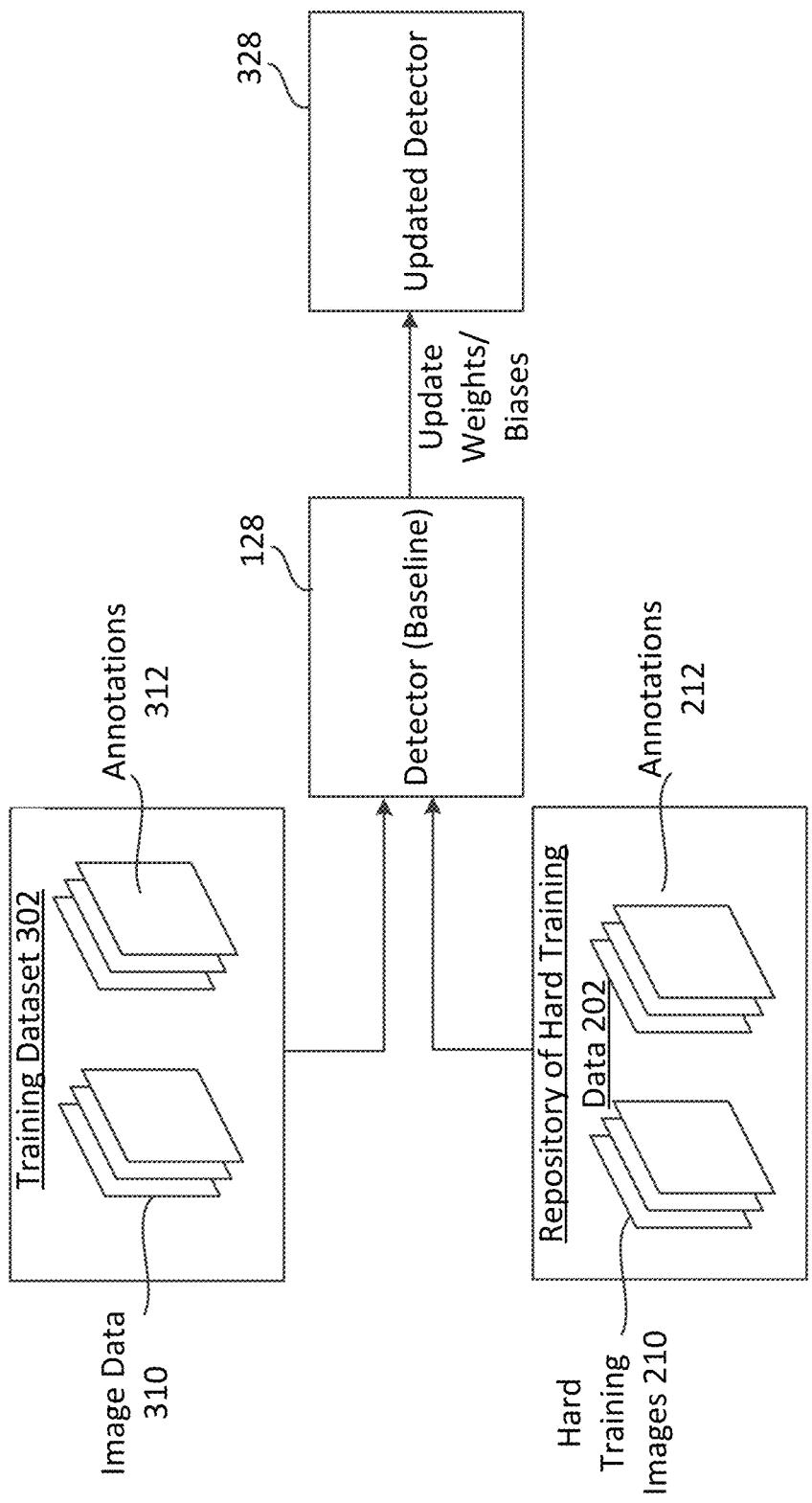
FIG. 3 is a block diagram depicting a training stage effective to train an object detector using hard training images, in accordance with various aspects of the present disclosure.

FIG. 3 is a block diagram depicting a training stage effective to train an object detector using hard training images, in accordance with various aspects of the present disclosure.

In various examples, synthetic composite image data training network 118 may be used to generate a particular number of hard training images 210. For example, a target number and/or threshold number of composite hard training images 210 may be determined. After the target and/or threshold number is reached, the hard training images 210 may be mixed with training data of training dataset 302 (e.g., a default training dataset for detector 128). Hard training images 210 may be frames of background image data 152 where pixel values of particular pixels of the background image have been replaced by pixel values of the segmented foreground image represented in foreground image data 150, as transformed by theta learner 124 and spatial transformation layer 126. Training dataset 302 may comprise one or more frames of image data 310. Each frame of image data 310 may be associated with one or more annotations 312. The annotations may provide a label including a classification of at least one object-of-interest within the frame (e.g., "human", "dog", etc.), and a location of the object-of-interest within the frame (e.g., a pixel address of the lower left-hand corner of a bounding box defining a number of contiguous pixels including the object-of-interest). Detector 128 may be trained using the mixture of hard training images 210 and training dataset 302 to update the weights and/or biases of detector 128 and generate updated detector 328. Training the detector 128 with hard training images 210 along with training dataset 302 may improve the performance of updated detector 328 relative to detector 128, as the hard training images 210 represent images in which the detector 128 was unable to accurately perform object detection. Accordingly, the hard training data may allow the detector 128 to reduce the number of detection "blind spots" in which the detector 128 is unable to accurately detect objects-of-interest in image data.

Figure 4:
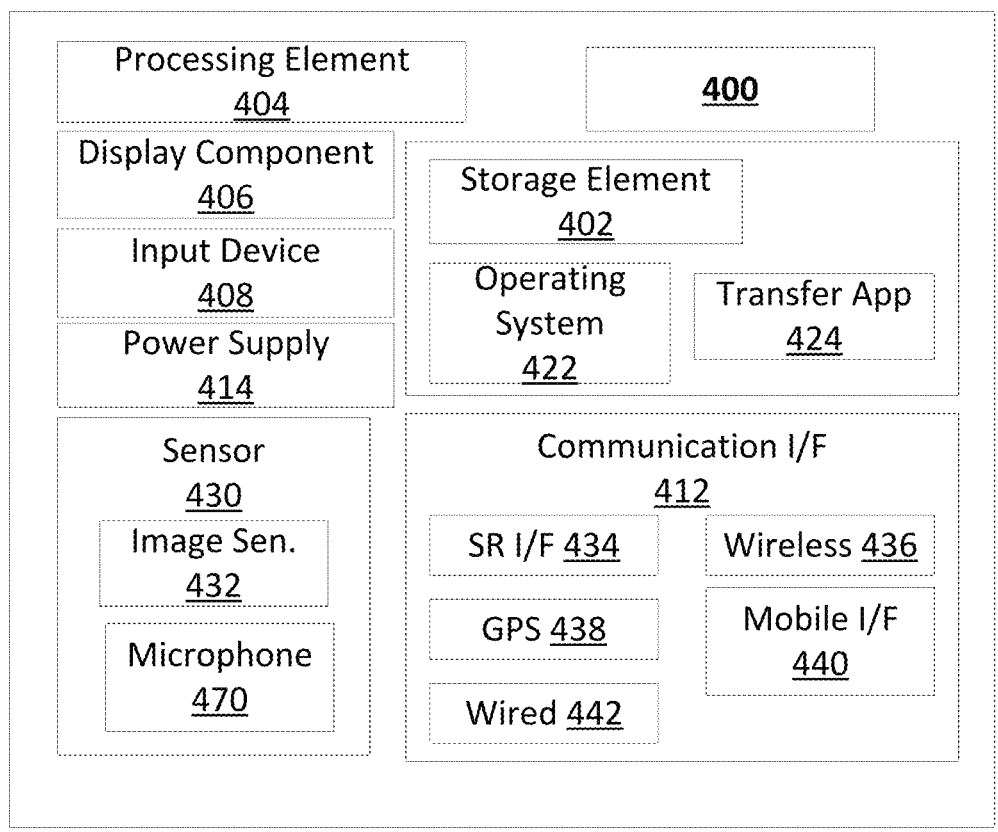
FIG. 4 depicts an example architecture of a computing device that may be used, in accordance with various aspects of the present disclosure.

FIG. 4 is a block diagram showing an example architecture 400 of a computing device, such as the processors and other computing devices described herein. It will be appreciated that not all user devices will include all of the components of the architecture 400 and some user devices may include additional components not shown in the architecture 400. The architecture 400 may include one or more processing elements 404 for executing instructions and retrieving data stored in a non-transitory computer-readable storage element 402. The processing element 404 may comprise at least one processor. Any suitable processor or processors may be used. For example, the processing element 404 may comprise one or more digital signal processors (DSPs) and/or image signal processors (ISPs). In some examples, the processing element 404 may be effective to perform one or more functions of detector 128, synthetic composite image data training network 118, FCNs 120a, 120b, theta learner 124, spatial transformation layer 126, natural image classifier 702, etc. The storage element 402 can include one or more different types of non-transitory, computer-readable memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to receive images and/or video from another device (e.g., a mobile device, image capture device, and/or display device) or from an image sensor 432 included in the architecture 400. In some examples, the transfer application 424 may also be configured to upload the received images to another device that may perform processing as described herein (e.g., a mobile device and/or another computing device).

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output.

Motion sensors may include any sensors that sense motion of the architecture including, for example, gyro sensors and accelerometers. Motion sensors, in some examples, may be used to determine an orientation, such as a pitch angle and/or a roll angle, of a camera. A gyro sensor may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. In some examples, an accelerometer (not shown in FIG. 4) may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 438 may be utilized as a motion sensor. For example, changes in the position of the architecture 400, as determined by the GPS interface 438, may indicate the motion of the GPS interface 438. As described, in some examples, image sensor 432 may be effective to detect infrared light. In at least some examples, architecture 400 may include an infrared light source to illuminate the surrounding environment.

Figure 5:
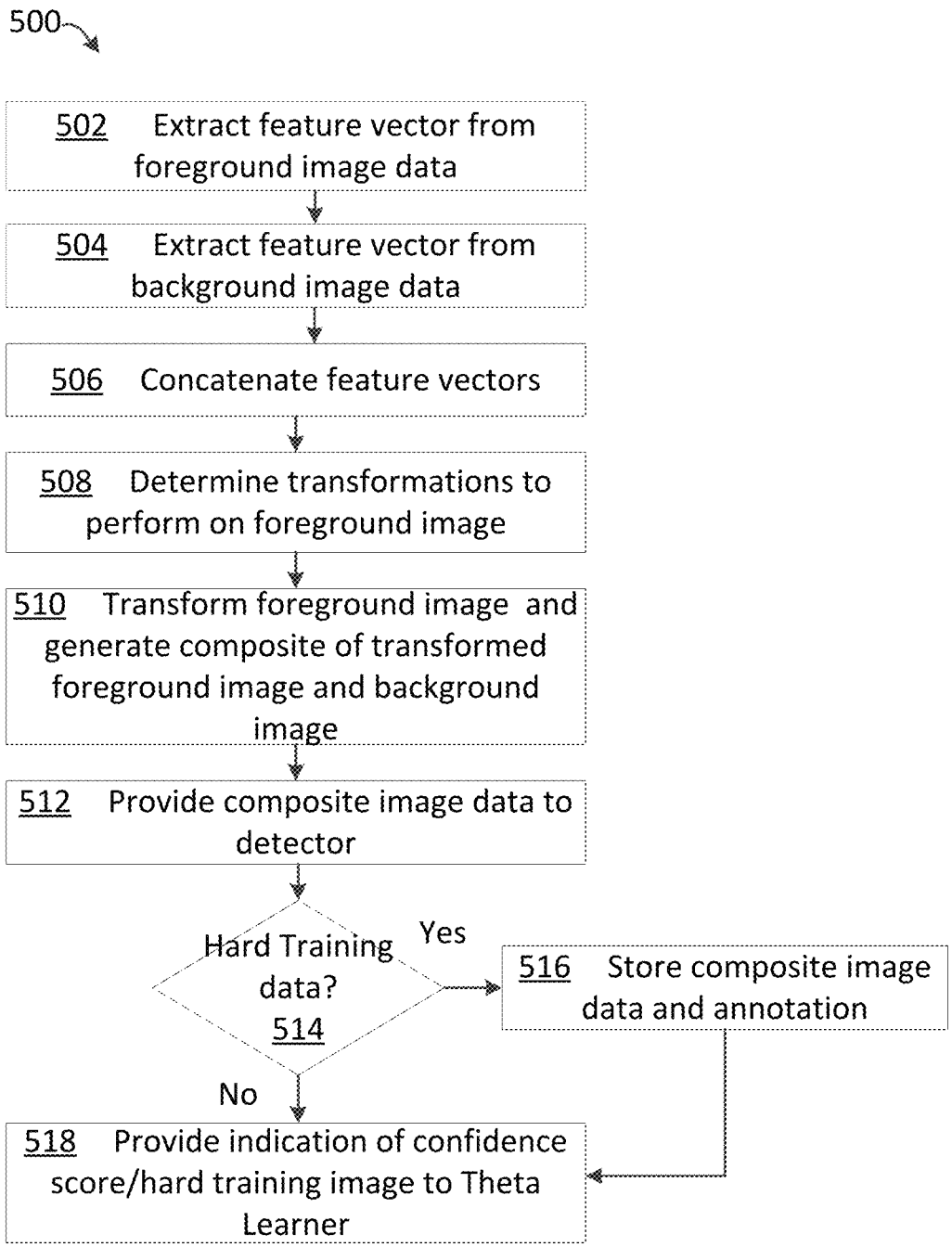
FIG. 5 depicts a process for generating synthetic image data for training an object detector, in accordance with various aspects of the present disclosure.

FIG. 5 depicts a process 500 for generating synthetic image data for training an object detector, in accordance with various aspects of the present disclosure. The process 500 of FIG. 5 may be executed by computing device(s) 102. The actions of process 500 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 500 may be described above with reference to elements of FIGS. 1-4.

Processing may begin at action 502, "Extract feature vector from foreground image data". At action 502, a feature vector representing input foreground image data may be extracted by a machine learning layer, such as FCN 120a. The feature vector may be a numeric representation of the input foreground image data. In various examples, the feature vector may be of a reduced dimensionality relative to the input foreground image data and may therefore reduce the complexity of further compute operations.

Processing may continue from action 502 to action 504, "Extract feature vector from background image data". At action 504, a feature vector representing input background image data may be extracted by a machine learning layer, such as FCN 120b. The feature vector may be a numeric representation of the input background image data. In various examples, the feature vector may be of a reduced dimensionality relative to the input background image data and may therefore reduce the complexity of further compute operations.

Processing may continue from action 504 to action 506, "Concatenate feature vectors". At action 506, the foreground and background feature vectors may be concatenated to generate a combined feature vector representing both the foreground image data and the background image data.

Processing may continue from action 506 to action 508, "Determine transformations to perform on foreground image". At action 508, a machine learning layer and/or model (e.g., theta learner 124) may determine one or more transformations to perform on the foreground image for compositing the foreground image with the background image. In various examples, the machine learning model may be trained to determine one or more spatial, color, and/or intensity operations to perform on the foreground image data in order to composite the foreground image with the background image in a way that is difficult for detector 128 to detect objects-of-interest present in the foreground image data.

Processing may continue from action 508 to action 510, "Transform foreground image and generate composite of transformed foreground image and background image." At action 510, spatial transformation layer 126 may perform one or more operations (e.g., operations determined by theta learner 124) to transform the foreground image and may composite the transformed foreground image on a pixel-by-pixel basis to replace pixels of the background image at a particular location determined by the theta learner 124 and spatial transformation layer 126 to generate a frame of synthetic composite image data. The synthetic composite image data may comprise the transformed foreground image combined with or "composited with" the background image data. The various operations determined by theta learner 124 and applied by spatial transformation layer 126 may be used to "paste" the foreground image data into the background image data in such a way that the detector 128 may have difficulty identifying objects-of-interest represented by the foreground image data. Theta learner 124 may be trained to minimize the confidence score of detections of objects-of-interest by detector 128.

Processing may continue from action 510 to action 512, "Provide composite image data to detector". At action 512, the synthetic composite image data generated by spatial transformation layer 126 may be provided to detector 128. In various other examples, the synthetic composite image data may be provided to a natural image classifier (e.g., a discriminator model) trained to make a determination as to whether input image data is natural image data or synthetic image data (e.g., the synthetic composite image data generated by spatial transformation layer 126). In various examples, a signal representing the output label (e.g., "natural" or "synthetic") from the natural language classifier may be back propagated to theta learner 124. The signal may be, for example, feedback data from the natural image classifier. Theta learner 124 may be trained using the back-propagated signal to determine operations used to transform foreground image data in a way that maximizes the likelihood that the natural language classifier determines that the synthetic composite image data is natural (e.g., non-synthetic). The synthetic composite image data may be provided to detector 128.

At action 514, a determination may be made whether the synthetic composite image data provided to detector 128 is a hard training image (e.g., a hard positive or hard negative). Hard positive training data may be image data for which detector 128 is unable to detect the presence of any objects-of-interest in the image data, despite the presence of objects-of-interest represented in the image data.

If, at action 514, a determination is made that the synthetic composite image data is a hard training image, processing may continue to action 516, "Store composite image data and annotation". At action 516, the hard training image (e.g., the synthetic composite image data for which detector 128 was unable to detect any objects-of-interest) may be stored in a non-transitory computer-readable memory. Additionally, since the spatial transformation layer 126 combines the foreground image data including the object(s)-of-interest, the annotation for the hard training image is known by system 100. Accordingly, the annotation for the synthetic composite image data is known and may be stored in the memory (e.g., repository of hard training data 202, FIG. 2) in association with the relevant hard training image.

If, at action 514, one or more objects-of-interest are detected in the synthetic composite image data, (e.g., the synthetic composite image data is not a hard positive), processing may proceed from action 514 to action 518, "Provide indication of confidence score/hard training image to theta learner". The confidence score for the detection of the object-of-interest may be provided to the theta learner. Weights/biases of the theta learner 124 may be updated to minimize the confidence score of the detector 128. If a hard training image is determined at action 514, an indication (e.g., a back propagation signal) that the synthetic composite image data was determined by detector 128 to be a hard training image may be provided to theta learner 124. Accordingly, the theta learner may be trained to generate operations to perform on the foreground image data that minimize the confidence score of detection of objects-of-interest by detector 128.

Figure 6:
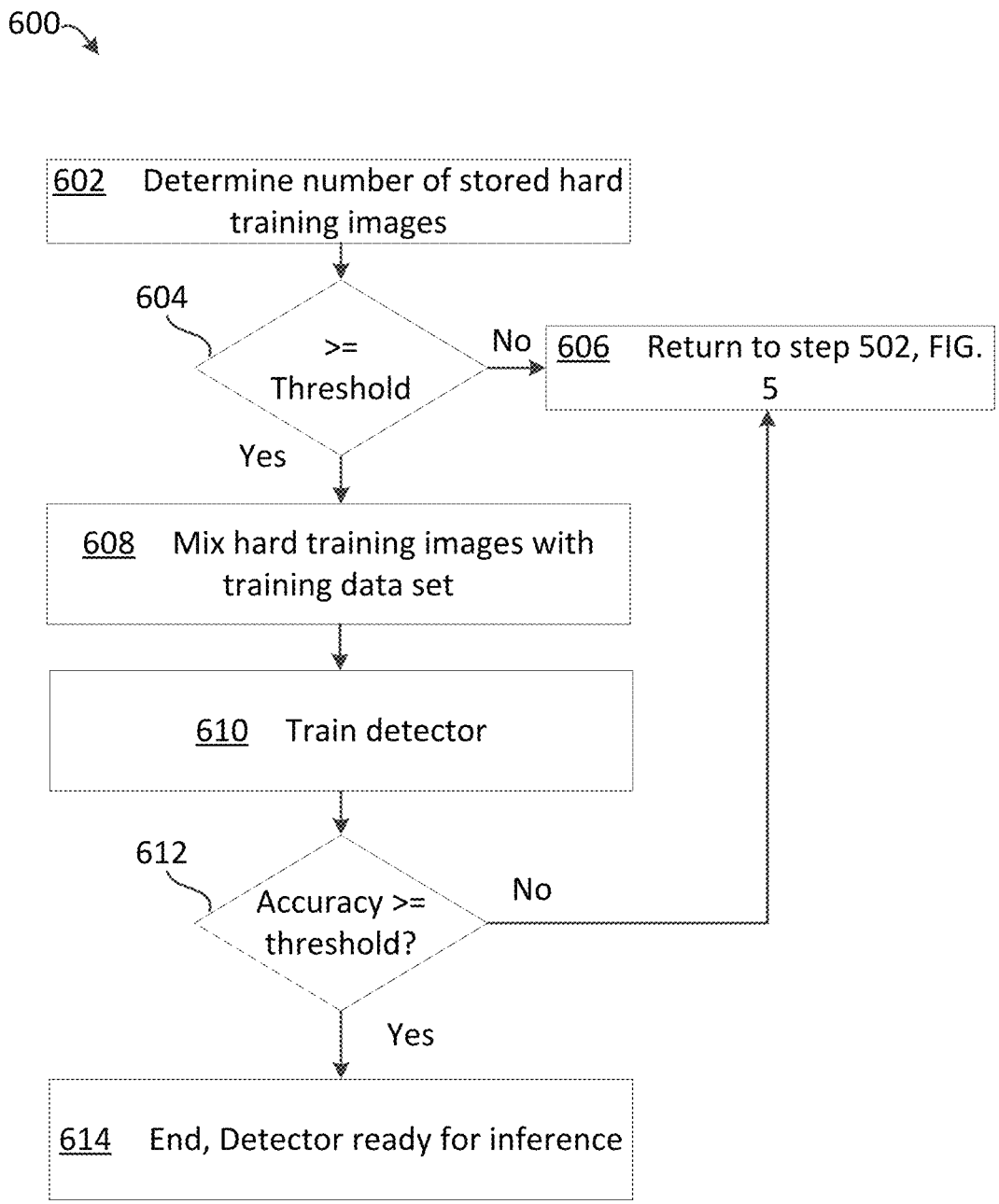
FIG. 6 depicts a process for training an object detector using synthetic image data, in accordance with various aspects of the present disclosure.

FIG. 6 depicts a process 600 for training an object detector using synthetic image data, in accordance with various aspects of the present disclosure. The process 600 of FIG. 6 may be executed by computing device(s) 102. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5.

Process 600 may begin at action 602, "Determine number of stored hard training images." At action 602, the number of frames of hard training images stored in repository of hard training data 202 may be determined. At action 604, a determination may be made whether the number of hard training images stored in repository of hard training data 202 is at, or exceeds, a threshold number of stored composite hard training images. In various other examples, a determination may be made whether a threshold number of synthetic composite image data with confidence scores below a predetermined level (e.g., less than 40%, less than 35%, or any other suitable confidence score) have been generated and stored in memory.

If, at action 604, a determination is made that the number of frames of hard training images (e.g., frames of synthetic composite image data that represent hard negatives or hard positives for the detector 128) does not meet or exceed the threshold or target number, processing may proceed to action 606 at which the process may return to action 502 of FIG. 5 and additional synthetic composite image data may be generated. Alternatively, if, at action 604, a determination is made that the number of hard training images meets or exceeds the threshold number of hard training images, processing may continue from action 604 to action 608, "Mix hard training images with training data set". In various examples, the hard training images stored in repository of hard training data 202 may be mixed with a training data set. The training data set may comprise annotated training data used to train detector 128. Any desired training data set may be used. For example, the training data set may be a training data set previously used to train detector 128 prior to initiating process 500 of FIG. 5. Various algorithms to mix synthetic composite image data with other training data are known and may be used. In at least some examples, an approximately equal number (e.g., to within a tolerance of +/−10%) of hard training image data and non-synthetic training data may be mixed (e.g., randomized or pseudo-randomized) to create a new set of training data. The ratio of hard training image data to regular training data (e.g., non-synthetic annotated image data) may be a tunable parameter and may be modified to improve the performance of the detector 128.

Processing may continue from action 608 to action 610, "Train detector". At action 610 the detector 128 may be trained using the newly generated set of training data comprising the mixture of hard training image data and non-synthetic image data. The performance of the detector may be improved as using annotated hard training image data to train the detector may reduce the number of "blind spots" of the detector, as the detector may learn how to detect objects-of-interest in the hard training images from the annotations. Although object detectors are generally described herein, the techniques described herein may be used to train segmentation algorithms and/or other CNN models.

Processing may continue from action 610 to action 612, at which a determination may be made whether the accuracy of detector 128 is greater than or equal to a threshold. For example, a set of test data (e.g., image data including objects-of-interest) may be used to test the detector 128 trained at action 610. If the accuracy of object detection exceeds a threshold level, processing may conclude at action 614 and the detector 128 may be ready for inference (e.g., runtime prediction). However, if the accuracy is less than the accuracy threshold, processing may return to action 502 of FIG. 5 and additional hard training images may be generated, mixed with other training data, and used to improve the performance of detector 128, in accordance with various techniques discussed herein. Alternatively, as described herein, the detector 128 may be retrained based at least in part on the number of times that theta learner 124 has been updated since the last training of detector 128.

Figure 7:
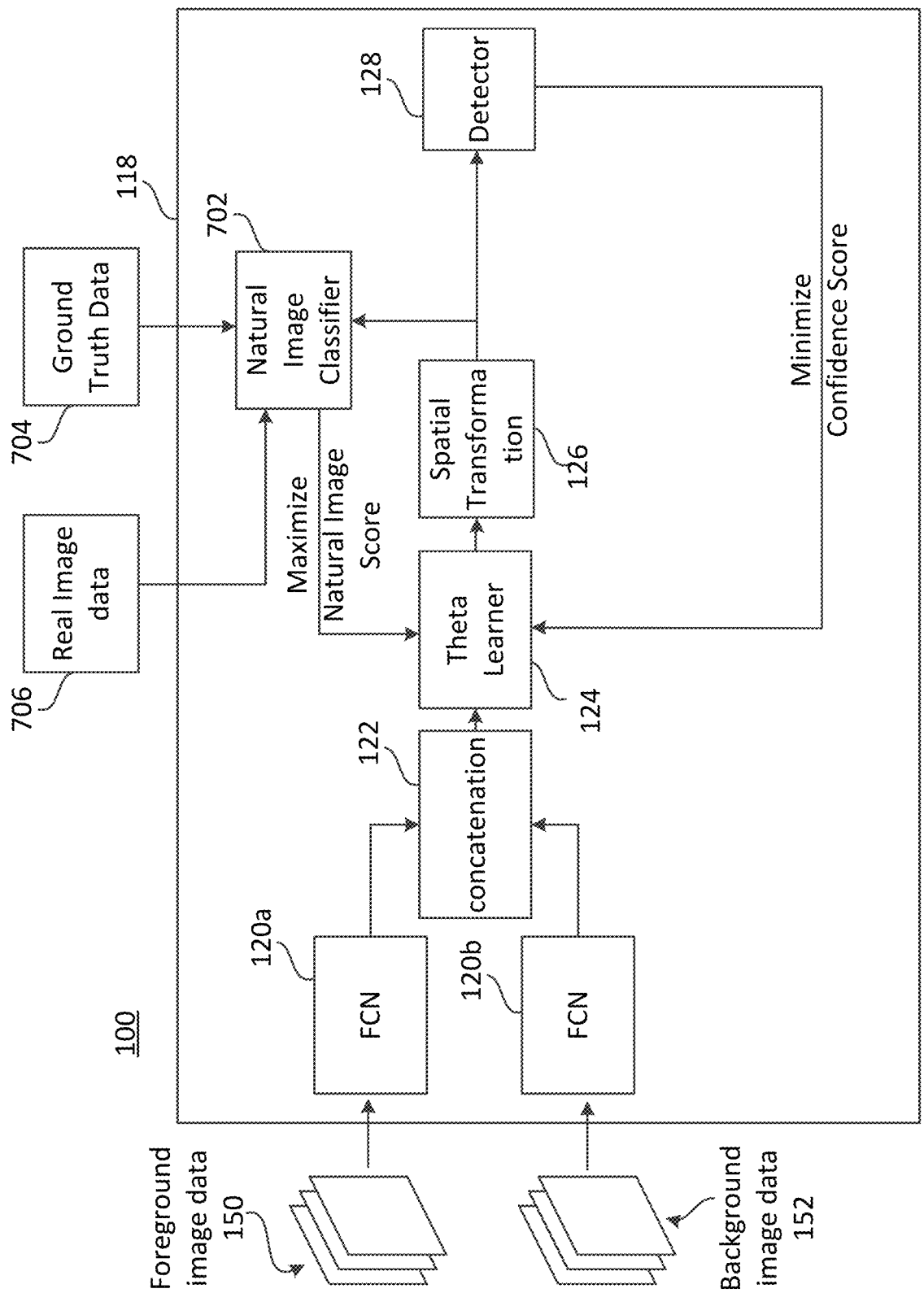
FIG. 7 is a block diagram showing an example system effective to generate synthetic image data including a natural image classifier, in accordance with various aspects of the present disclosure.

FIG. 7 is a block diagram showing an example system effective to generate synthetic image data including a natural image classifier 702, in accordance with various aspects of the present disclosure. System 100 may comprise a natural image classifier 702.

Natural image classifier 702 may be a discriminator pre-trained to generate natural image scores (e.g., binary decision data) indicating whether or not input image data is synthetic or non-synthetic (e.g., real). As previously described, synthetic image data may be synthetic composite image data generated, for example, using the processes described above in reference to FIGS. 1-6. In various examples, non-synthetic image data may comprise natural or "real" image data, such as image data captured by a camera. In various examples, a natural image score of "1" for an input image may indicate that the image is non-synthetic or "real" while a natural image score of "0" for an input image may indicate that the image is synthetic or "fake". Real image data 706 may be provided to natural image classifier 702 along with the synthetic composite image data generated by synthetic composite image data training network 118. The output (e.g., the binary decision data described above) may be back propagated to theta learner 124. Theta learner may be trained using the back-propagated signal with the training goal of maximize the natural image score of natural image classifier 702. Accordingly, weights and/or biases of theta learner 124 may be updated to maximize the natural image score of the natural image classifier 702. It should be appreciated that in other examples, "0" may represent a real image while "1" may represent a fake image data. In such examples, the theta learner may be trained to minimize the natural image score. Various other implementations are possible. In general, the natural image classifier 702 may be used to increase the likelihood that synthetic composite image data generated by system 100 closely resembles natural image data such as image data captured by a camera. Additionally, ground truth data 704 may be provided and used to train natural image classifier 702. The ground truth data 704 may be data indicating whether an image evaluated by natural image classifier 702 was non-synthetic or synthetic. In other words, ground truth data 704 may indicate that real image data 706 is real and may indicate that synthetic composite image data generated by synthetic composite image data training network 118 is fake. Parameters of natural image classifier 702 may be updated based on ground truth data 704 to maximize the accuracy of natural image classifier 702.

In various examples, the ratio of updates for natural image classifier 702 relative to detector 128 may be greater than 1, while the ratio of updates for natural image classifier 702 relative to theta learner 124 may be less than one. In an example, parameters of theta learner 124 may be updated every iteration of synthetic composite image data training network 118 while parameters of natural image classifier 702 may be updated every four iterations of synthetic composite image data training network 118. In an example, parameters of detector 128 may be updated every 16 iterations of synthetic composite image data training network 118. The update ratios of theta learner 124, natural image classifier 702, and detector 128 may be a tunable parameter that may be adjusted to improve performance of synthetic composite image data training network 118 and detector 128. Generally, updating theta learner 124 more frequently than natural image classifier 702, and updating natural image classifier 702 more frequently than detector 128 may provide a significantly improved accuracy of detector 128 after a suitable number of iterations.

Among other potential benefits, various embodiments of the present disclosure may be effective to generate synthetic composite image data that may be used to improve the performance of a computer vision detector. In particular, the various techniques described herein may be used to automatically generate annotated hard training images by combining foreground image data that includes an object-of-interest (e.g., an object for which the detector has been trained to detect) with a background image. Since the hard training images represent image data that the detector currently is unable to correctly process to detect objects-of-interest, generation of annotated hard training images may be highly useful for re-training the detector so that the detector may thereafter be able to improve its performance during runtime in detecting objects in image data that is similar to the hard training images. Additionally, automatic generation of annotated synthetic composite image data in accordance with the various techniques described herein exponentially increases the amount of training data that may be used to train a computer vision detector without requiring the data to be manually annotated. Additionally, the various back propagation techniques described herein may be used to improve the ability of the system to detect "blind spots" for a particular computer vision detector and to generate training data that is tailored to remedy such "blind spots" of the detector by "teaching" the detector to recognize objects in such image data.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 8:
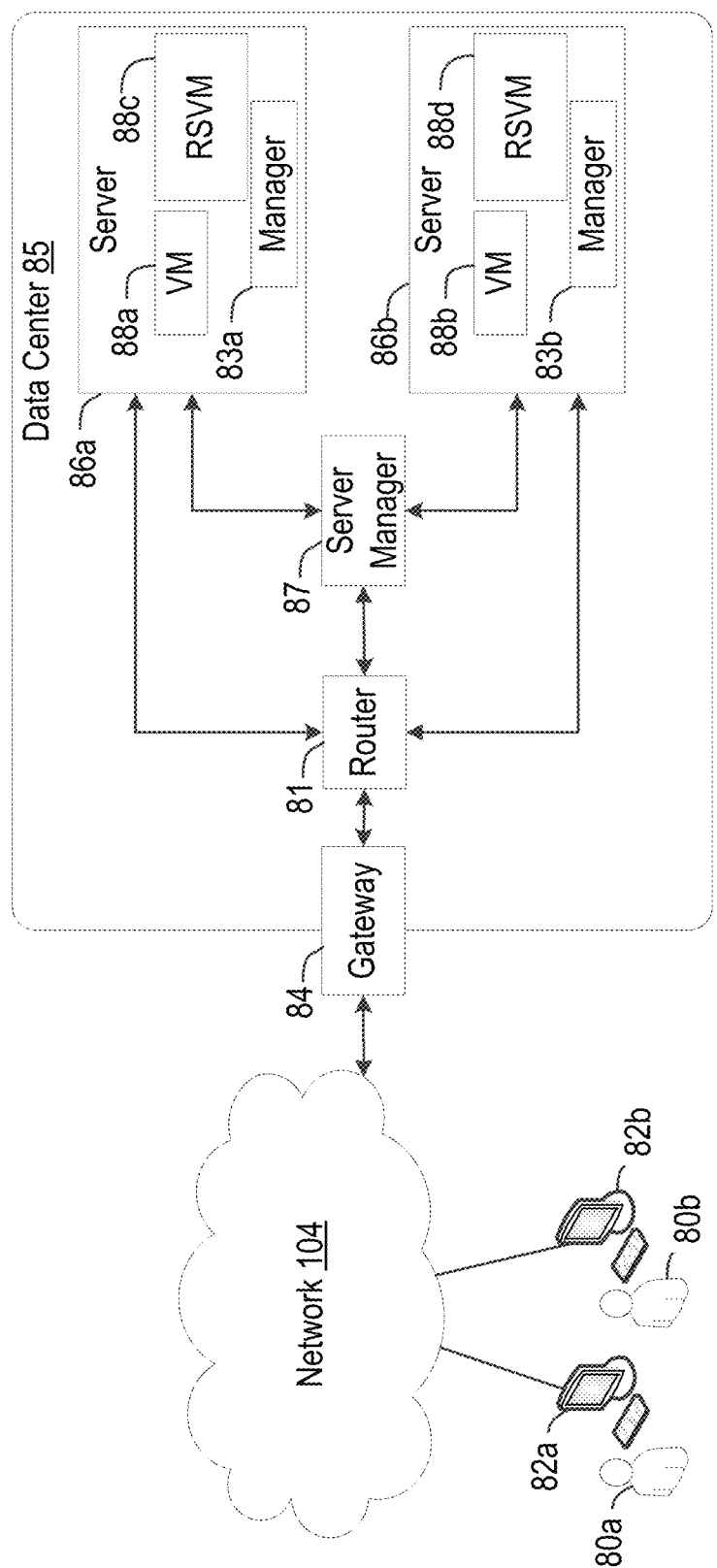
FIG. 8 is a diagram illustrating an example system for sending and providing data that may be used in accordance with the present disclosure.

An example system for sending and providing data and generation of synthetic data for computer vision object detection models will now be described in detail. In particular, FIG. 8 illustrates an example computing environment in which the embodiments described herein may be implemented. FIG. 8 is a diagram schematically illustrating an example of a data center 85 that can provide computing resources to users 80a and 80b (which may be referred herein singularly as user 80 or in the plural as users 80) via user computers 82a and 82b (which may be referred herein singularly as user computer 82 or in the plural as user computers 82) via network 104. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 86a and 86b (which may be referred herein singularly as server 86 or in the plural as servers 86) that provide computing resources. These resources may be available as bare metal resources or as virtual machine instances 88a-d (which may be referred herein singularly as virtual machine instance 88 or in the plural as virtual machine instances 88). In at least some examples, server manager 87 may control operation of and/or maintain servers 86. Virtual machine instances 88c and 88d are rendition switching virtual machine ("RSVM") instances. The RSVM virtual machine instances 88c and 88d may be configured to perform all, or any portion, of the techniques for improved rendition switching and/or any other of the disclosed techniques in accordance with the present disclosure and described in detail above. As should be appreciated, while the particular example illustrated in FIG. 8 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 82. User computers 82 may be computers utilized by users 80 or other customers of data center 85. For instance, user computer 82a or 82b may be a server, a desktop or laptop personal computer, a tablet computer, a wireless telephone, a personal digital assistant (PDA), an e-book reader, a game console, a set-top box or any other computing device capable of accessing data center 85. User computer 82a or 82b may connect directly to the Internet (e.g., via a cable modem or a Digital Subscriber Line (DSL)). Although only two user computers 82a and 82b are depicted, it should be appreciated that there may be multiple user computers.

User computers 82 may also be utilized to configure aspects of the computing resources provided by data center 85. In this regard, data center 85 might provide a gateway or web interface through which aspects of its operation may be configured through the use of a web browser application program executing on user computer 82. Alternately, a stand-alone application program executing on user computer 82 might access an application programming interface (API) exposed by data center 85 for performing the configuration operations. Other mechanisms for configuring the operation of various web services available at data center 85 might also be utilized.

Servers 86 shown in FIG. 8 may be servers configured appropriately for providing the computing resources described above and may provide computing resources for executing one or more web services and/or applications. In one embodiment, the computing resources may be virtual machine instances 88. In the example of virtual machine instances, each of the servers 86 may be configured to execute an instance manager 83a or 83b (which may be referred herein singularly as instance manager 83 or in the plural as instance managers 83) capable of executing the virtual machine instances 88. The instance managers 83 may be a virtual machine monitor (VMM) or another type of program configured to enable the execution of virtual machine instances 88 on server 86, for example. As discussed above, each of the virtual machine instances 88 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 81 may be utilized to interconnect the servers 86a and 86b. Router 81 may also be connected to gateway 84, which is connected to network 104. Router 81 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a data center 85 is also employed to at least in part direct various communications to, from and/or between servers 86a and 86b. While FIG. 8 depicts router 81 positioned between gateway 84 and data center 85, this is merely an exemplary configuration. In some cases, for example, data center 85 may be positioned between gateway 84 and router 81. Data center 85 may, in some cases, examine portions of incoming communications from user computers 82 to determine one or more appropriate servers 86 to receive and/or process the incoming communications. Data center 85 may determine appropriate servers to receive and/or process the incoming communications based on factors such as an identity, location or other attributes associated with user computers 82, a nature of a task with which the communications are associated, a priority of a task with which the communications are associated, a duration of a task with which the communications are associated, a size and/or estimated resource usage of a task with which the communications are associated and many other factors. Data center 85 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method comprising:
    receiving first image data comprising a first plurality of pixel values representing an object and a second plurality of pixel values representing a first background image;
    generating, from the first image data, first foreground image data comprising the first plurality of pixel values and first background image data comprising the second plurality of pixel values;
    generating a first feature vector representing the first plurality of pixel values of the first foreground image data;
    generating a second feature vector representing a third plurality of pixel values of second background image data, the second background image data representing a second background image;
    generating a transformed representation of the first foreground image data using the first foreground image data and data from a first machine learning model;
    generating a frame of composite image data by combining the transformed representation with the second background image data;
    sending the frame of composite image data to an object detector trained to detect objects of a first class;
    sending, by the object detector to the first machine learning model, data representing a loss related to object detection; and
    updating a parameter of the first machine learning model.

2. The method of claim 1, further comprising:
    determining, by the object detector, a confidence score that the object represented in the frame of composite image data is of the first class;
    sending feedback data indicating the confidence score to the first machine learning model; and
    updating a weight of the first machine learning model based at least in part on the feedback data.

3. The method of claim 1, further comprising:
    determining, by the object detector, that no objects of the first class are represented in the frame of composite image data;
    storing the frame of composite image data in a memory;
    determining a number of frames of composite image data stored in the memory;
    determining that the number of frames of composite image data stored in the memory is greater than a threshold number of frames, wherein the threshold number of frames represents a target number of frames used to train the object detector; and
    updating a parameter of the object detector based at least in part on the frames of composite image data stored in the memory.

4. The method of claim 1, further comprising:
    determining, by the first machine learning model based at least in part on the first feature vector and the second feature vector, a first operation to perform on the first foreground image data, wherein the generating the transformed representation of the first foreground image data comprises performing the first operation on the first foreground image data.

5. The method of claim 1, further comprising:
    sending the frame of composite image data to a natural image classifier;
    generating, by the natural image classifier, a first label indicating that the frame of composite image data is synthetic;
    generating a second machine learning model by updating a second parameter of the first machine learning model based at least in part on the first label;
    sending a second frame of composite image data to the natural image classifier, the second frame of composite image data generated based at least in part by the second machine learning model; and generating, by the natural image classifier, a second label indicating that the second frame of composite image data is non-synthetic.

6. The method of claim 1, further comprising:
determining, by the first machine learning model, a first subset of the third plurality of pixel values of the second background image data based at least in part on the first feature vector and the second feature vector; and
replacing the first subset of the third plurality of pixel values of the second background image data with the first plurality of pixel values of the first foreground image data.

7. The method of claim 1, further comprising modifying the first foreground image data such that the object appears translated or rotated in the frame of composite image data when the frame of composite image data is rendered on a display relative to an appearance of the object when the first image data is rendered on the display.

8. The method of claim 1, further comprising:
determining, by the object detector, a confidence score that the object represented in the frame of composite image data is of the first class;
sending feedback data indicating the confidence score to the first machine learning model;
updating a second parameter of the first machine learning model;
generating a second frame of composite image data by combining a second transformed representation of second foreground image data with third background image data, wherein the object is represented by the second foreground image data;
sending the second frame of composite image data to the object detector; and
determining, by the object detector, that no objects of the first class are represented in the second frame of composite image data.

9. The method of claim 1, further comprising:
sending a second frame of composite image data to the object detector, wherein the second frame of composite image data represents the object;
determining that no objects are detected by the object detector in the second frame of composite image data;
updating a parameter of the object detector based at least in part on a plurality of frames of composite image data;
sending the second frame of composite image data to the object detector; and
determining, by the object detector, a location of the object represented in the second frame of composite image data.

10. A system comprising:
at least one processor; and
a non-transitory, computer-readable memory storing instructions that, when executed by the at least one processor, are effective to program the at least one processor to perform a method comprising:
receiving first image data comprising a first plurality of pixel values representing an object and a second plurality of pixel values representing a first background image;
generating, from the first image data, first foreground image data comprising the first plurality of pixel values and first background image data comprising the second plurality of pixel values;
generating a first feature vector representing the first plurality of pixel values of the first foreground image data;
generating a second feature vector representing a third plurality of pixel values of second background image data, the second background image data representing a second background image;
generating a transformed representation of the first foreground image data using the first foreground image data and data from a first machine learning model;
generating a frame of composite image data by combining the transformed representation with the second background image data;
sending the frame of composite image data to an object detector trained to detect objects of a first class;
sending, by the object detector to the first machine learning model, data representing a loss related to object detection; and
updating a parameter of the first machine learning model.

11. The system of claim 10, wherein the instructions when executed by the at least one processor are effective to program the at least one processor to perform the method further comprising:
determining, by the object detector, a confidence score that the object represented in the frame of composite image data is of the first class;
sending feedback data indicating the confidence score to the first machine learning model; and
updating a weight of the first machine learning model based at least in part on the feedback data.

12. The system of claim 10, wherein the instructions when executed by the at least one processor are effective to program the at least one processor to perform the method further comprising:
determining, by the object detector, that no objects of the first class are represented in the frame of composite image data;
storing the frame of composite image data in a memory;
determining a number of frames of composite image data stored in the memory;
determining that the number of frames of composite image data stored in the memory is greater than a threshold number of frames, wherein the threshold number of frames represents a target number of frames used to train the object detector; and
updating a parameter of the object detector based at least in part on the frames of composite image data stored in the memory.

13. The system of claim 12, wherein the instructions when executed by the at least one processor are effective to program the at least one processor to perform the method further comprising:
determining, by the first machine learning model based at least in part on the first feature vector and the second feature vector, a first operation to perform on the first foreground image data, wherein the generating the transformed representation of the first foreground image data comprises performing the first operation on the first foreground image data.

14. The system of claim 10, wherein the instructions when executed by the at least one processor are effective to program the at least one processor to perform the method further comprising:
sending the frame of composite image data to a natural image classifier;

generating, by the natural image classifier, a first label indicating that the frame of composite image data is synthetic;

generating a second machine learning model by updating a second parameter of the first machine learning model based at least in part on the first label;

sending a second frame of composite image data to the natural image classifier, the second frame of composite image data generated based at least in part by the second machine learning model; and generating, by the natural image classifier, a second label indicating that the second frame of composite image data is non-synthetic.

15. The system of claim 10, wherein the instructions when executed by the at least one processor are effective to program the at least one processor to perform the method further comprising:

determining, by the first machine learning model, a first subset of the first third plurality of pixel values of the second background image data based at least in part on the first feature vector and the second feature vector; and replacing the first subset of the third plurality of pixel values of the second background image data with the first plurality of pixel values of the first foreground image data.

16. The system of claim 10, wherein the instructions when executed by the at least one processor are effective to program the at least one processor to perform the method further comprising modifying the first foreground image data such that the object appears translated or rotated in the frame of composite image data when the frame of composite image data is rendered on a display relative to an appearance of the object when the first image data is rendered on the display.

17. The system of claim 10, wherein the instructions when executed by the at least one processor are effective to program the at least one processor to perform the method further comprising:

determining, by the object detector, a confidence score that the object represented in the frame of composite image data is of the first class;

sending feedback data indicating the confidence score to the first machine learning model;

updating a second parameter of the first machine learning model;

generating a second frame of composite image data by combining a second transformed representation of second foreground image data with third background image data, wherein the object is represented by the second foreground image data;

sending the second frame of composite image data to the object detector; and determining, by the object detector, that no objects of the first class are represented in the second frame of composite image data.

18. A method comprising:

receiving first image data comprising a first plurality of pixel values representing an object and a second plurality of pixel values representing a first background image;

generating, from the first image data, first foreground image data comprising the first plurality of pixel values;

generating, from the first image data, first background image data comprising the second plurality of pixel values;

generating a first feature vector representing the first plurality of pixel values of the first foreground image data;

receiving second background image data comprising a third plurality of pixel values, the second background image data representing a second background image;

generating a first background feature vector representing the third plurality of pixel values of second background image data;

generating a transformed representation of the first foreground image data using the first foreground image data and data from a first machine learning model;

generating a frame of composite image data from the transformed representation and the second background image data;

sending the frame of composite image data to an object detector trained to detect humans;

sending, by the object detector to the first machine learning model, data representing a loss related to object detection; and updating a parameter of the first machine learning model.

19. The method of claim 18, further comprising:

determining, by the object detector, a confidence score representing a probability that the first plurality of pixel values represents a human;

sending feedback data indicating the confidence score to the first machine learning model; and updating a weight of the first machine learning model based at least in part on the feedback data.

20. The method of claim 18, further comprising:

determining, by the object detector, that no humans are represented in the frame of composite image data;

storing the frame of composite image data in a memory;

determining a number of frames of composite image data stored in the memory;

determining that the number of frames of composite image data stored in the memory is greater than a threshold number of frames, wherein the threshold number of frames represents a target number of frames used to train the object detector; and updating a parameter of the object detector based at least in part on the frames of composite image data stored in the memory.

* * * * *